(12) United States Patent
Alben et al.

(10) Patent No.: US 7,095,386 B2
(45) Date of Patent: Aug. 22, 2006

(54) GRAPHICS SYSTEM INCLUDING A PLURALITY OF HEADS

(75) Inventors: Jonah Matthew Alben, San Jose, CA (US); Krishnaraj S. Rao, Sunnyvale, CA (US)

(73) Assignee: nVidia Corporation, Santa Clara, CA (US)

( * ) Notice: Subject to any disclaimer, the term of this patent is extended or adjusted under 35 U.S.C. 154(b) by 134 days.

(21) Appl. No.: 09/877,462

(22) Filed: Jun. 7, 2001

(65) Prior Publication Data

US 2002/0186218 A1  Dec. 12, 2002

(51) Int. Cl.
*G09G 5/00* (2006.01)

(52) U.S. Cl. .................. 345/3.1; 345/5; 345/506; 345/520; 710/14

(58) Field of Classification Search .............. 345/1.1, 345/3.1, 5, 506, 519, 520
See application file for complete search history.

(56) References Cited

U.S. PATENT DOCUMENTS

| | | | | |
|---|---|---|---|---|
| 5,138,305 A * | 8/1992 | Tomiyasu | ................. | 345/3.1 |
| 5,414,831 A * | 5/1995 | Wilson et al. | ................. | 710/3 |
| 5,488,385 A * | 1/1996 | Singhal et al. | ................. | 345/3.1 |
| 5,500,654 A * | 3/1996 | Fujimoto | ................. | 345/634 |
| 5,694,141 A * | 12/1997 | Chee | ................. | 345/3.1 |
| 5,786,825 A * | 7/1998 | Cain et al. | ................. | 345/501 |
| 5,841,418 A * | 11/1998 | Bril et al. | ................. | 345/3.1 |
| 6,023,281 A * | 2/2000 | Grigor et al. | ................. | 345/543 |
| 6,215,459 B1 * | 4/2001 | Reddy et al. | ................. | 345/3.1 |
| 6,333,750 B1 * | 12/2001 | Odryna et al. | ................. | 345/629 |
| 6,424,320 B1 * | 7/2002 | Callway | ................. | 345/1.1 |
| 6,628,243 B1 * | 9/2003 | Lyons et al. | ................. | 345/1.1 |

* cited by examiner

*Primary Examiner*—Kee M. Tung
*Assistant Examiner*—Antonio Caschera

(57) ABSTRACT

A graphics display system is disclosed. The display system comprises a plurality of heads. Each of the plurality of heads includes a VGA controller and each of the plurality of heads is adapted for a display. The graphics display system also includes a host coupled to the plurality of heads, wherein all the standard VGA settings for each of the plurality of the heads could be programmed by a single command by the host. Each of the heads are adapted for a display. A system and method for providing a broadcast mode VGA feature is disclosed. A method and system in accordance with the present invention includes one VGA controller per head. In so doing, in a broadcast mode a write transaction from the bus is broadcast or written to both heads. Also, in a broadcast mode, the VGA read data from the bus always comes from one of the heads. The output timing registers specific to a non-CRT output are not broadcast. To provide broadcast VGA to a CRT and/or a flat panel, software sets up the timing in extended registers and enables the display devices. The VGA application can then provide mode settings via the appropriate write VGA registers and the correct display will be on each head.

15 Claims, 4 Drawing Sheets

GRAPHICS SYSTEM INCLUDING A PLURALITY OF HEADS

FIELD OF THE INVENTION

The present invention relates generally to a graphics display system and more particularly to a graphics display system that includes a broadcast mode VGA feature.

BACKGROUND OF THE INVENTION

Typically in a graphics display system, it is desirable to be able to display the images to different types of displays. Conventional graphic display systems do allow displaying to a different display, but only if the timing is exactly the same for the displays. For example, in a conventional graphics display system, if a flat panel provides a 1600× 1200×60 Hz scale image, a cathode ray tube (CRT) will display the same scale image. Typically this is accomplished utilizing a single head design which works for one display pipeline. To describe this single head design in more detail, refer now to FIG. 1.

FIG. 1 is a block diagram of a conventional graphics display system 10. The conventional graphics display system 10 includes a memory 12 which is in communication with a frame buffer interface 14. The system 10 includes a host 16 which receives programming signals from an AGP (or PCI) bus 18 which controls both a VGA controller 20 and a CRT controller 22. The VGA controller 20 retrieves information from and provides information to the frame buffer interface and communicates with the CRT controller 22 via register signals. The CRT controller 22 is coupled to pipeline 24. The VGA controller 20, CRT controller 22 and pipeline 24 comprise a single display head 40. In this single head system 10, the CRT controller 22 then provides data through a pipeline 24 to a plurality of displays, for example a CRT 26, flat panel (FP) display 28 or a television 30. Each of the displays can be serially switched onto the single head graphics system 10 or all of the displays can simultaneously receive the signals from the graphics system 10.

A problem with the single head system is that, unless all of the displays are timing compatible, then there are timing issues associated therewith. Accordingly, the pipeline would require complex circuitry to ensure that these timing issues are addressed, which would significantly add to the cost of the graphics display system. The conventional graphics display system 10 works well with traditional panels (800× 600, 1024×768) which use standard VESA timings. However, the mobile industry is moving aggressively towards large flat panels (1600×1200, 2048×1536) with non-standard timings.

In addition, the higher resolutions are not supported by most CRTs. If multiple displays are to be utilized simultaneously they must be coupled tightly together. This is oftentimes undesirable because the costs associated with circuitry to allow for compatibility is prohibitive.

Accordingly, what is needed is a system that overcomes the above-identified problems. The present invention addresses such a need.

SUMMARY OF THE INVENTION

A graphics display system is disclosed. The display system comprises a plurality of heads. Each of the plurality of heads includes a VGA controller. Each of the heads is adapted for a display. The graphics display system also includes a host coupled to the plurality of heads, wherein all the standard VGA settings for each of the plurality of the heads are programmed by a single command by the host.

A system and method for providing a broadcast mode VGA feature is disclosed. A method and system in accordance with the present invention includes one VGA controller per head. In so doing, in a broadcast mode a write transaction from the bus is broadcast or written to both heads. Also, in a broadcast mode, the VGA data read from the bus always comes from one of the heads. The output timing registers specific to a non-CRT output are not broadcast. To provide broadcast VGA to a CRT and/or a flat panel, the software sets up the timing in extended registers and enables the CRT. The VGA application can then provide mode settings via the appropriate write to VGA registers and the correct display will be on each head.

DETAILED DESCRIPTION

The present invention relates generally to a graphics display system and more particularly to a graphics display system that includes a plurality of heads. The following description is presented to enable one of ordinary skill in the art to make and use the invention and is provided in the context of a patent application and its requirements. Various modifications to the preferred embodiment and the generic principles and features described herein will be readily apparent to those skilled in the art. Thus, the present invention is not intended to be limited to the embodiment shown but is to be accorded the widest scope consistent with the principles and features described herein.

Figure 1:
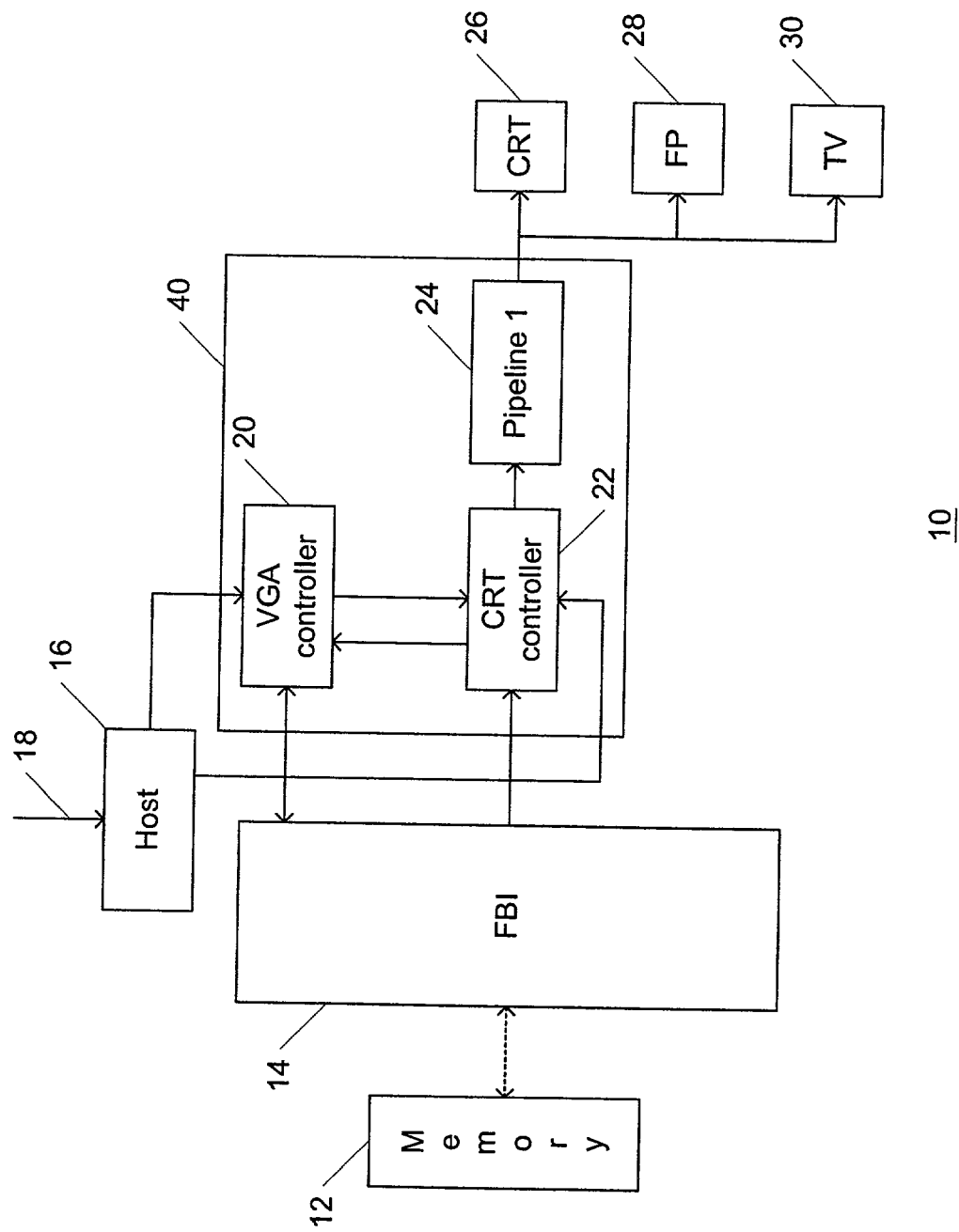
FIG. 1 is a block diagram of a conventional graphics display system.
Figure 2:
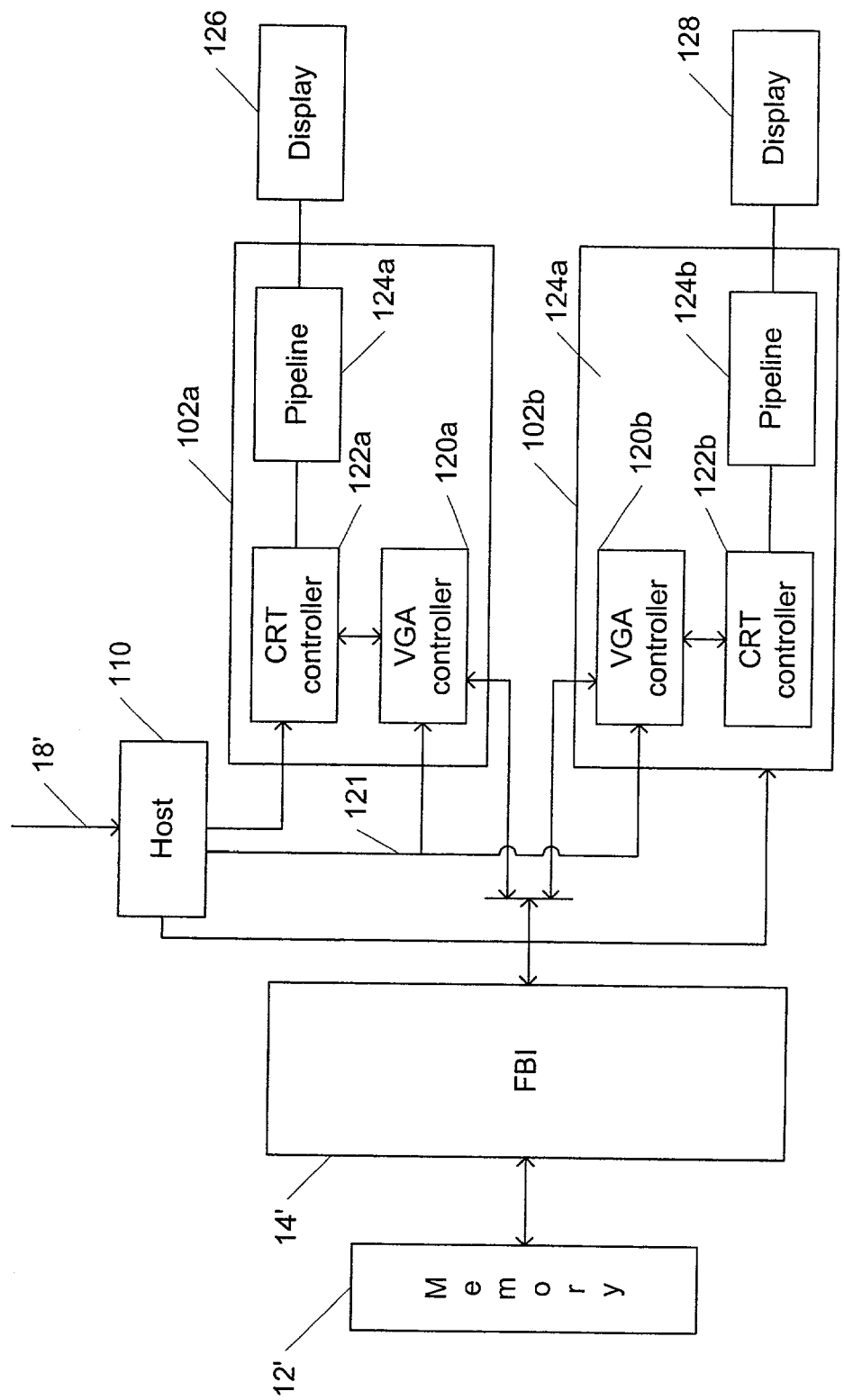
FIG. 2 is a block diagram of a graphics display system in accordance with the present invention.

FIG. 2 is a block diagram of a graphics display system 100 in accordance with the present invention. The graphics display system 100 includes first and second display heads 102a and 102b which can be individually programmed via the host 110. Each of the heads 102a and 102b are in communication with a frame buffer interface 14'. Although two heads 102a and 102b are shown in accordance with the preferred embodiment, one of ordinary skill in the art readily recognizes that there can be any number of heads within the graphics system and that would be within the spirit and scope of the present invention.

Each head 102a and 102b is also in communication with the host 110 which receives programming signals from an AGP (or PCI) bus 18'. The host 110 communicates with both of the CRT controllers 122a and 122b. The VGA controllers 120a and 120b retrieve information from and provide information to the frame buffer interface and communicate with is respective CRT controller, 122a or 122b, via register signals.

Each of the CRT controllers 122a and 122b then provides data through its respective pipeline 124a or 124b to a plurality of displays, for example, flat panel displays, TV and a CRT. The host 110, in a custom mode, provides programming signals to the CRT controllers 122a and 122b to provide the custom settings for the particular display (i.e., flat panel, television and/or CRT).

This allows each of those heads, 102a and 102b, to operate independently. The host 110 in a broadcast mode also provides a standard VGA programming signal 121, which sets the VGA register settings in both VGA controllers 120a and 120b. In so doing, the standard VGA programming signal 121 allows each of the heads 102a and 102b to be programmed simultaneously.

Figure 3:
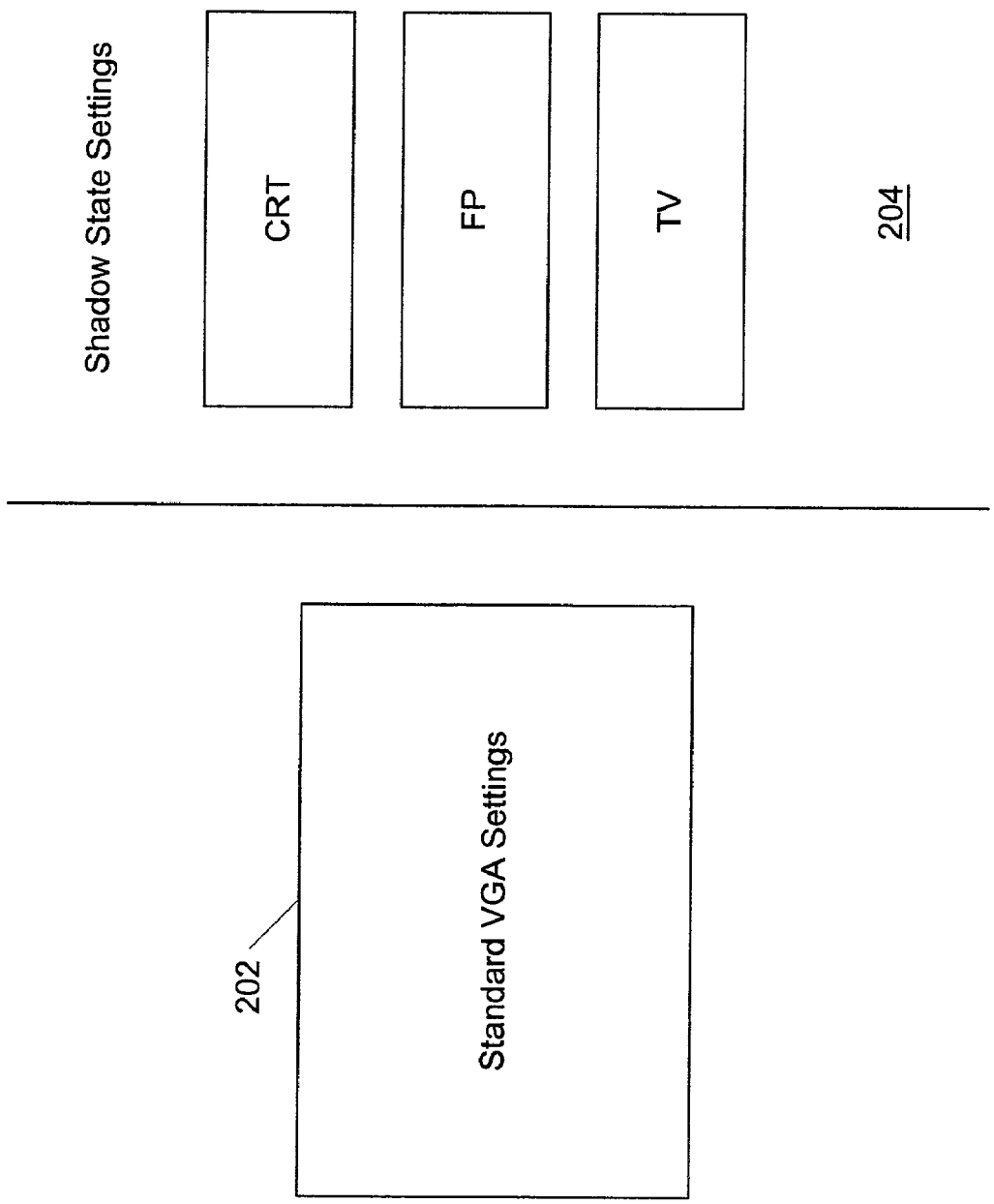
FIG. 3 is a diagram that illustrates areas for VGA register settings 202 and shadow state register settings 204 for the custom settings for the specific display.

FIG. 3 is a diagram that illustrates areas for VGA register settings 202 and shadow state register settings 204 for the custom settings for the specific display. In the shadow state register settings 204, which the VGA controller has no access to, the custom timing information for the particular display (i.e., a CRT, FP or TV) is stored. The host also provides the standard VGA settings for all of the active heads.

In a preferred embodiment, in broadcast VGA mode, the VGA write transactions from the bus are broadcast, i.e., written to both heads, 102a and 102b, substantially simultaneously. Furthermore, in broadcast mode, the VGA data that are read from the bus always comes from head 102a (since both of the heads should have the same read data). Accordingly, the broadcast VGA mode allows a single screen surface to be displayed to two totally arbitrary displays with independent timing (CRT at 640×480×85 Hz, FP at 1600×1200×60 Hz scaled, etc.).

To describe the present invention in more detail refer now to the following discussion in conjunction with the accompanying figures.

Figure 4:
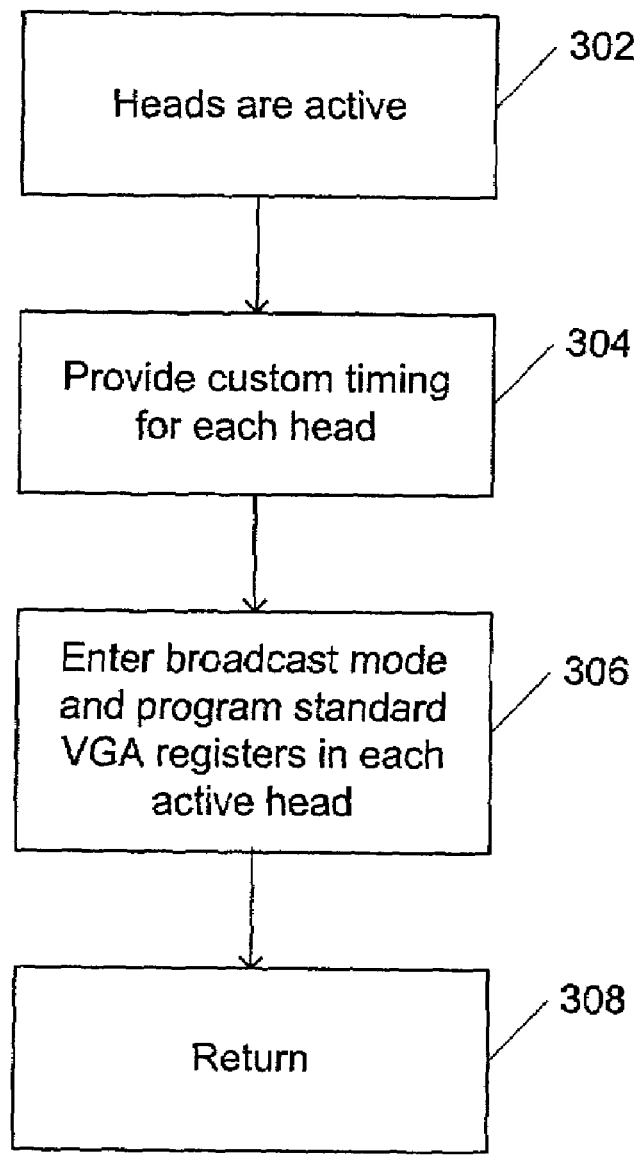
FIG. 4 is a flow chart illustrating a process for programming both VGA controllers simultaneously within the graphics display system in accordance with the present invention.

FIG. 4 is a flow chart illustrating a process for programming both VGA controllers simultaneously within the graphics display system in accordance with the present invention. Accordingly, in a system and method in accordance with the present invention, first the graphics application determines which heads within the display system are to be active, via step 302. Then, the custom timing for each head is provided, via step 304. In this mode, those settings which relate to the type of device (i.e., flat panel television, CRT, etc.) are set. Next, broadcast mode is entered and the VGA registers for all of the active heads are programmed through a single command, via step 306. Finally, control of the display system is returned to the graphics application for each of the particular heads, via step 308. Accordingly, a single command can be utilized for simultaneously programming or switching display modes on each of heads in a multiple head graphics display system.

A system and method for providing a broadcast mode VGA feature is disclosed. A method and system in accordance with the present invention includes one VGA controller per head. In so doing, in a broadcast mode a write transaction from the bus is broadcast or written to both heads. Also, in a broadcast mode, the VGA read data from the bus always comes from one of the heads. The output timing registers specific to a non-CRT output are not broadcast. To provide broadcast VGA to a CRT and/or a flat panel, software sets up the timing in extended registers and enables the CRT. The VGA application can then provide mode settings via the appropriate write VGA registers and the correct display will be on each head.

Although the present invention has been described in accordance with the embodiments shown, one of ordinary skill in the art will readily recognize that there could be variations to the embodiments and those variations would be within the spirit and scope of the present invention. Accordingly, many modifications may be made by one of ordinary skill in the art without departing from the spirit and scope of the appended claims.

What is claimed is:

1. A graphics display system comprising:
  a plurality of heads wherein each head is adapted for a particular display, each of the plurality of heads comprising:
    a VGA controller;
    a CRT controller coupled to the VGA controller; and
    a pipeline coupled to the CRT controller; and
  a host coupled to the plurality of heads, for receiving programming signals from a bus, and for providing programming signals containing standard VGA settings to a first group of registers in said VGA controller by a single command in a broadcast mode that is broadcasted to VGA controllers in the plurality of heads over a single bus, and for providing custom specific programming signals to a second group of registers accessible by said CRT controller depending upon the display attached to the particular head in a custom mode.

2. The graphics display system of claim 1 wherein providing broadcast mode programming signals comprises writing programming signals to the plurality of heads substantially simultaneously and reading programming signals from one of the plurality of heads when in the broadcast mode.

3. The graphics display system of claim 2 wherein the host provides custom timing signals for each of the plurality of heads dependent upon the display when in the custom mode.

4. The graphics display system of claim 1 wherein the display can be any of the following: a CRT display, a flat panel display and a television.

5. The graphics display system of claim 1, where custom timing information for the particular display is stored in the second group of register.

6. The graphics display system of claim 5 wherein custom timing information specific to a non-CRT output is not broadcast.

7. The graphics display system of claim 5, wherein the VGA controller has no access to the custom timing information.

8. The graphics display system of claim 1, wherein the broadcast mode allows a single screen surface to be displayed on two different displays each having different timing.

9. A graphics display system comprising:
  a plurality of heads, wherein each head is adapted for a particular display, and wherein each head includes a VGA controller, wherein each VGA controller of each head comprises:
    a standard VGA register; and
    a shadow state register; and
  a host coupled to the plurality of heads for receiving programming signals, for programming the standard VGA register with a standard VGA setting for each head in a broadcast mode over a single bus, and for programming the shadow state register of a given head with a custom specific setting for a corresponding display in a custom mode, wherein the host reads data from one of the VGA controllers in the broadcast mode.

10. The graphics display system of claim 9, wherein each of the plurality of heads further comprises:
  a CRT controller coupled to the VGA controller;
  a pipeline coupled to the CRT controller; and
  a display coupled to the pipeline.

11. The graphics display system of claim 10, wherein the display can be any of the following: a CRT display, a flat panel display and a television.

12. A graphics display system comprising:
a first head comprising:
   a first VGA controller including a first standard VGA register and a first shadow state register;
   a first CRT controller coupled to the first VGA controller; and
   a first pipeline coupled to the first CRT controller;
a second head comprising:
   a second VGA controller a second standard VGA register and a second shadow state register;
   a second CRT controller coupled to the second VGA controller; and
   a second pipeline coupled to the second CRT controller; and
a host for first programming the first VGA controller with a first custom timing information, for second programming the second VGA controller with a second custom timing information, and for third programming the first and second VGA controllers with standard timing information and switching display modes with a single command over a single bus.

13. The graphics display system of claim 12, wherein the host reads data from one of the first and second VGA controllers.

14. The graphics display system of claim 13, wherein the host provides the first custom timing programming information to the first VGA controller dependent upon a type of a display coupled to the first head.

15. The graphics display system of claim 14, wherein the display can be any of the following: a CRT display, a flat panel display and a television.

* * * * *